United States Patent
Cho et al.

(10) Patent No.: US 9,755,321 B2
(45) Date of Patent: Sep. 5, 2017

(54) SMART ANTENNA SYSTEM AND METHOD FOR IMPROVING RECEIVING PERFORMANCE THEREOF

(71) Applicant: ELECTRONICS AND TELECOMMUNICATIONS RESEARCH INSTITUTE, Daejeon (KR)

(72) Inventors: Young Kyun Cho, Daejeon (KR); Bong Hyuk Park, Daejeon (KR); Jung Hoon Oh, Daejeon (KR); Jung Nam Lee, Daejeon (KR); Gweon Do Jo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/006,283

(22) Filed: Jan. 26, 2016

(65) Prior Publication Data
US 2016/0218785 A1    Jul. 28, 2016

(30) Foreign Application Priority Data
Jan. 26, 2015 (KR) .................. 10-2015-0012242

(51) Int. Cl.
*H04B 17/00* (2015.01)
*H01Q 19/32* (2006.01)
*H04B 7/08* (2006.01)

(52) U.S. Cl.
CPC ............. *H01Q 19/32* (2013.01); *H04B 7/086* (2013.01)

(58) Field of Classification Search
CPC ........................... H04B 7/0615; H04B 7/0848
USPC ........................................ 455/67.11
See application file for complete search history.

(56) References Cited

U.S. PATENT DOCUMENTS

| | | | | |
|---|---|---|---|---|
| 6,600,456 B2* | 7/2003 | Gothard | ................. | H01Q 1/246 342/372 |
| 6,876,337 B2* | 4/2005 | Larry | ................. | H01Q 11/08 343/818 |
| 7,009,559 B2* | 3/2006 | Regnier | ................. | H01Q 1/246 342/372 |
| 7,215,297 B2* | 5/2007 | Gothard | ................. | H01Q 1/241 342/367 |
| 7,330,152 B2* | 2/2008 | Zhang | ................. | H01Q 3/24 343/700 MS |
| 7,453,413 B2* | 11/2008 | Larry | ................. | H01Q 1/36 342/372 |

(Continued)

FOREIGN PATENT DOCUMENTS

KR    10-2009-0061271 A    6/2009

*Primary Examiner* — April G Gonzales
(74) *Attorney, Agent, or Firm* — NSIP Law

(57) ABSTRACT

A smart antenna system according to an exemplary embodiment of the present invention including a beam forming antenna which includes an active antenna and a plurality of parasitic antennas, the system including: a reactance load which is connected to the parasitic antenna; a transceiver which transmits and receives a signal to the beam forming antenna; and an antenna adjusting block which tracks a signal source in real time using a plurality of beam patterns having the largest signal size and forms a beam in a direction having the largest signal size.

15 Claims, 10 Drawing Sheets

(56) References Cited

U.S. PATENT DOCUMENTS

| | | | | |
|---|---|---|---|---|
| 7,528,789 | B2* | 5/2009 | Gothard | H01Q 1/241 343/834 |
| 8,362,962 | B2* | 1/2013 | Rowson | H01Q 1/243 343/700 MS |
| 8,437,330 | B2* | 5/2013 | Proctor, Jr. | H04W 52/42 370/335 |
| 8,648,755 | B2* | 2/2014 | Rowson | H01Q 1/243 343/700 MS |
| 2010/0156722 | A1* | 6/2010 | Park | H01Q 19/32 342/374 |

\* cited by examiner

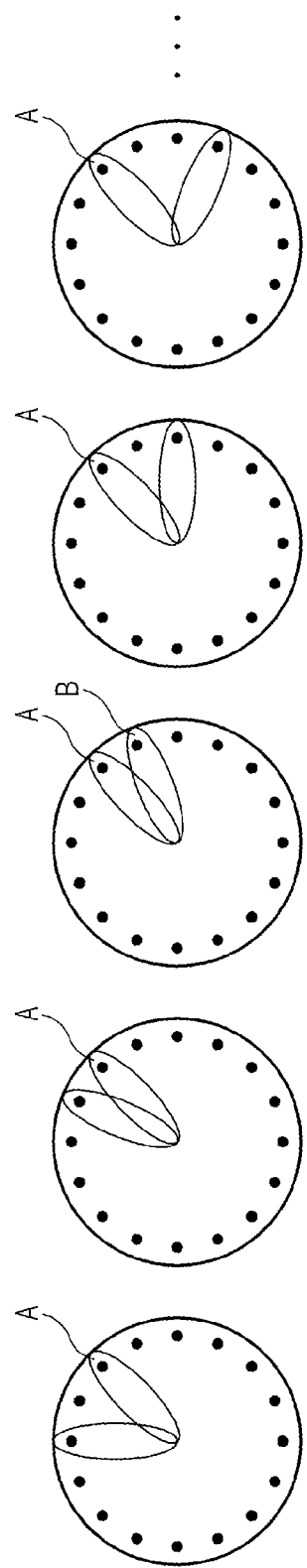

SMART ANTENNA SYSTEM AND METHOD FOR IMPROVING RECEIVING PERFORMANCE THEREOF

CROSS-REFERENCE TO RELATED APPLICATIONS

This application claims priority to and the benefit of Korean Patent Application No. 10-2015-0012242 filed in the Korean Intellectual Property Office on Jan. 26, 2015, the entire contents of which are incorporated herein by reference.

TECHNICAL FIELD

The present invention relates to a smart antenna system and a method for improving a receiving performance thereof, and more particularly, to a technique which adjusts an antenna beam by adjusting a load of a parasitic antenna in accordance with a signal so as to increase sensitivity of a signal.

BACKGROUND ART

Various paths interfere with wireless communication signals which are transmitted through a channel. The interference causes signal fading and signal attenuation which lowers a signal to noise ratio (SNR) as a result, thereby deteriorating a quality of a received signal.

Therefore, methods which receive the received signals through several antennas (for example, an array antenna) in order to reduce interference of a signal in accordance with multiple paths have been suggested. The multiple antenna has an excellent effect to improve a quality of the signal, but since individual antennas are configured by active antennas, the number of RF transceivers is undesirably increased in proportion to the number of antennas.

In order to solve the above-mentioned problem, a beam forming antenna using a single RF transceiver has been suggested. The beam forming antenna drives an active antenna through a single RF chain and adjusts a reactance of a parasitic antenna to adjust a direction of the beam, thereby increasing reception sensitivity. However, a single RF chain beam forming antenna of the related art has the following problems.

First, complex channel modeling and a digital process are required to achieve beam forming to increase the reception sensitivity. The method has a long computing time, so that it is difficult to track a signal source which varies in real time and a load for a digital block is increased. Therefore, it is difficult to maximize an effect of reducing the RF chain.

Second, since it is required to complete beam tracking during an idle time to change a beam pattern of an antenna, the computing time is increased as the number of parasitic antennas is increased, so that it is difficult to exactly estimate a direction of the beam. Further, since the RF chain cannot receive the signal while finding the beam, the reception efficiency is reduced. Specifically, in spite of detecting an optimal direction, there may be an additional problem in that the sensitivity of the signal is ironically reduced during a computation period to track the other direction.

Third, a reactance load to form a pattern of a beam generally uses a capacitance between both ends of a variable diode element or a phase shift technology of a parasitic antenna using a phase shifter, but in order to implement a desired capacitance, the variable diode needs to be applied with high power voltage of 10 V or larger and the minute adjustment of the phase shifter is not possible for each, and an insertion loss is large, so that it is difficult to apply the antenna of the related art to the system.

SUMMARY OF THE INVENTION

The present invention has been made in an effort to track a signal source using a plurality of beams in a beam forming antenna and to provide a smart antenna system which after fixing an optimal first beam pattern which is tracked in an initial operation mode, additionally finds an optimal second beam pattern using another beam to track a signal source in real time, thereby increasing reception sensitivity, and a method for improving a receiving performance thereof.

An exemplary embodiment of the present invention provides a smart antenna system including a beam forming antenna which includes an active antenna and a plurality of parasitic antennas, the system including: a reactance load which is connected to the parasitic antenna; a transceiver which transmits and receives a signal to the beam forming antenna; and an antenna adjusting block which tracks a signal source in real time using a plurality of beam patterns having the largest signal size and forms a beam in a direction having the largest signal size.

The antenna adjusting block may include: an antenna adjusting block which measures a strength of a signal of a beam pattern for every parasitic antenna, compares the strengths of signals to fix the beam pattern of a signal having the strongest strength as a first beam pattern and sequentially performs the beam forming while fixing the first beam pattern to track a second beam pattern having the strongest strength of the signal.

The antenna adjusting block may form a final beam pattern using the first beam pattern and the second beam pattern.

The antenna adjusting block may form the first beam pattern and the second beam pattern to have the same size.

The antenna adjusting block may form the first beam pattern and the second beam pattern to have different sizes.

The antenna adjusting unit may further include: a signal receiving unit which measures and compares the signal strengths; and a parasitic antenna control unit which adjusts the reactance load in accordance with the strength of the signal by being interworked with the signal receiving unit.

The parasitic antenna control unit may set the reactance load such that the signal has the strongest strength.

The signal receiving unit may process a signal in parallel with the transceiver.

The signal receiving unit may include: an amplifier which amplifies a received signal; a mixer which converts the signal amplified by the amplifier into a base band signal; a low pass filter which performs low pass filtering on the signal which is converted into the base band signal by the mixer; an analog to digital converter which converts the filtered signal into a digital signal; a register which sequentially stores the digital signal; and a comparator which compares sizes of the digital signals which are sequentially stored.

The antenna adjusting block may perform beam forming during a receiving mode of the transceiver and track the signal source in real time.

The reactance load may include a switch which has one end connected to the parasitic antenna and is connected by the antenna adjusting block so that the other end is connected to the variable inductor or the variable capacitor; a first reactance matching circuit which is connected to the variable capacitor to set a load value of the parasitic antenna;

and a second reactance matching circuit which is connected to the variable inductor to set a load value of the parasitic antenna.

The first and second reactance matching circuits may include a variable inductor whose one end is connected to the ground voltage terminal; and a variable capacitor whose one end is connected to the ground voltage terminal and the other end is connected to the variable inductor.

Another exemplary embodiment of the present invention provides an improving method of a receiving performance of a smart antenna system, including: sequentially performing primary beam forming when entering a receiving mode; measuring strengths of signals for beam patterns formed by the primary beam forming and comparing the strengths of the signals of the beam patterns to determine and fix a first beam pattern having the strongest strength of the signal; performing secondary beam forming in a state when the first beam pattern is fixed; measuring strengths of signals for beam patterns formed by the secondary beam forming and comparing the strengths of the signals of the beam patterns to determine a second beam pattern having the strongest strength of the signal; and determining a final beam pattern using the first beam pattern and the second beam pattern.

The method may further include: determining the first beam pattern as a final beam pattern when the strength of the signal by the final beam pattern obtained by combining the first beam pattern and the second beam pattern is weaker than the strength of the signal of the first beam pattern.

In the determining of a second beam pattern, the second beam pattern having the same size as the first beam pattern may be formed.

In the determining of a second beam pattern, the second beam pattern having different sizes from the first beam pattern may be formed.

According to the exemplary embodiment of the present invention, it is possible to improve sensitivity of a signal by tracking a signal source in real time using a plurality of beams in an overall receiving mode without affecting a transceiving system.

Further, it is possible to) exactly control a reactance load value using a reactance matching circuit.

Further, it is possible to measure and compare sizes of signals of the beam patterns without using a complex digital block.

BRIEF DESCRIPTION OF THE DRAWINGS

FIG. 3B is a view illustrating a process of sequentially forming a beam with the same size by a smart antenna system according to an exemplary embodiment of the present invention.

Figure 1:
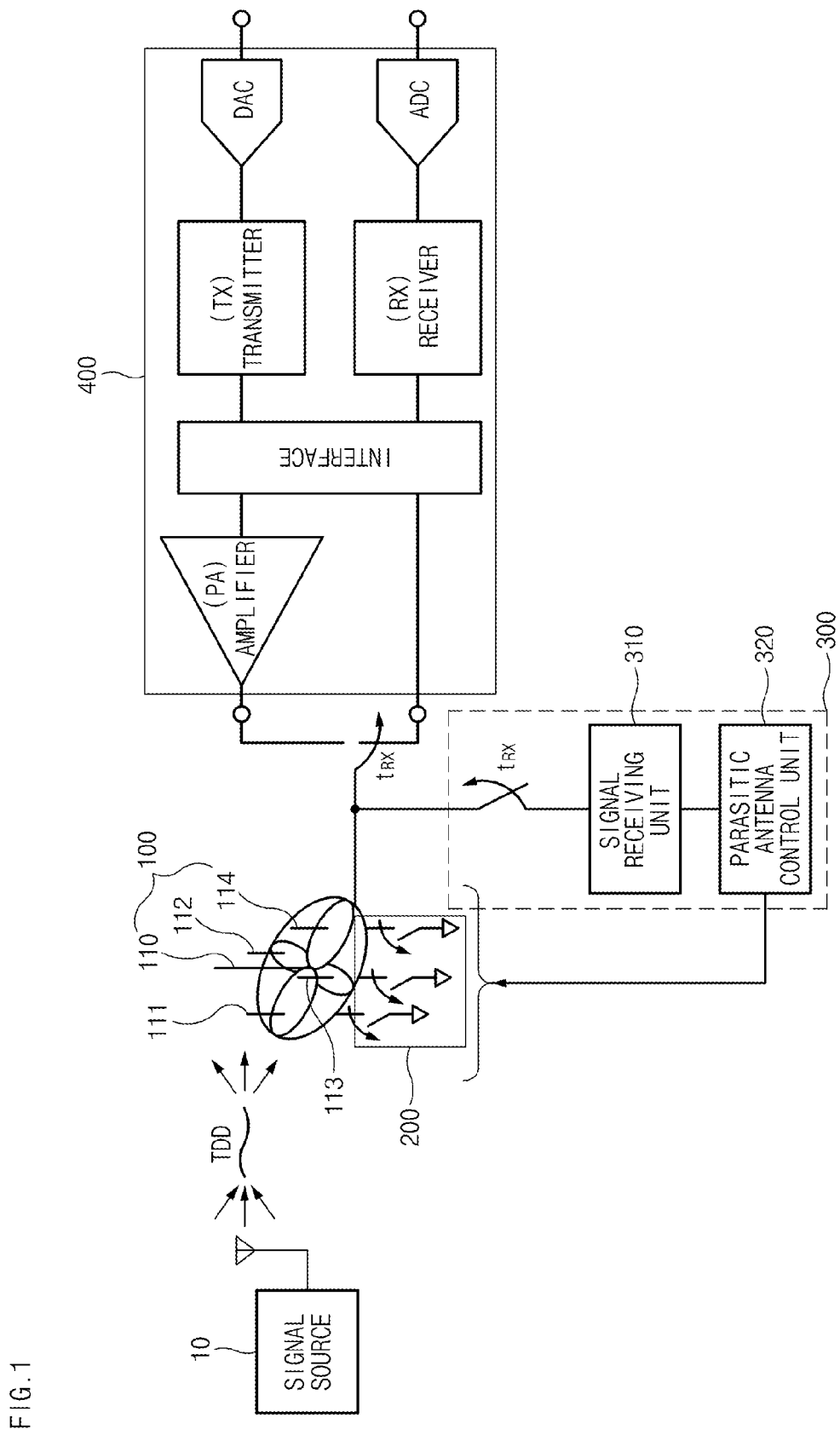
FIG. 1 is a configuration diagram of a smart antenna system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the most preferred exemplary embodiments of the present invention will be described in detail with reference to the accompanying drawings so that those skilled in the art may easily carry out the technical spirit of the present invention.

The present invention suggests a technique which compares strengths of received signals to form a beam toward a largest signal without using a complex mathematical model such as a channel model of the related art or a beam forming algorithm, thereby improving sensitivity of the signal. That is, when a reactance load of the parasitic antenna at which a characteristic of the received signal, such as a signal to noise ratio (SNR) or an adjacent channel leakage ratio (ACLR), is maximized is adjusted, the direction of the beam is changed and thus a direction of the beam which has optimal reception sensitivity may be determined.

Hereinafter, exemplary embodiments of the present invention will be specifically described with reference to FIGS. 1 to 7.

FIG. 1 is a configuration diagram of a smart antenna system according to an exemplary embodiment of the present invention.

The smart antenna system according to an exemplary embodiment of the present invention includes a beam forming antenna 100, a reactance load 200, an antenna adjusting block (AAB) 300, and a transceiver 400.

The beam forming antenna 100 is configured by a main antenna 110 which is
an active antenna and four parasitic antennas 111, 112, 113, and 114. In this case, the number of parasitic antennas may be adjusted depending on other requirements, such as an angle and a reception time of the beam to be formed.

The reactance load 200 is connected to one of the parasitic antennas 111, 112, 113, and 114 to determine the direction of the beam. The reactance load 200 will be specifically described below with reference to FIGS. 5A and 5B.

The antenna adjusting block 300 calculates a size of a signal, compares the size with a size of a previous signal to adjust a reactance of the parasitic antenna so as to generate a maximum signal size, thereby controlling a radiating direction of the beam. That is, the antenna adjusting block 300 compares a size of the signal which is received through a signal receiving unit 310 through by the antenna to find a reactance condition having the largest signal size to control the reactance load 200.

To this end, the antenna adjusting block 300 includes a signal receiving unit 310 (RSU, Receiving Signal Unit) and a parasitic antenna control unit (PCU) 320. The signal receiving unit 310 measures a strength of a signal for every direction of beam and determines a direction of a beam having the highest strength of the signal. The parasitic antenna control unit 320 adjusts the reactance load 200 which is connected to the parasitic antennas 111, 112, 113, and 114 in accordance with a result of determining a direction of the beam in accordance with the signal strength of the signal receiving unit 310. That is, the parasitic antenna control unit 320 sets a reactance such that the strength of the signal is the highest, in accordance with the determination result of the signal receiving unit 310.

The transceiver 400 receives a signal received through the main antenna 110 or transmits a transmission signal to the main antenna 110. The transceiver 400 may be implemented by a generally used transceiver so that specific description of a detailed configuration will be omitted.

Figure 2:
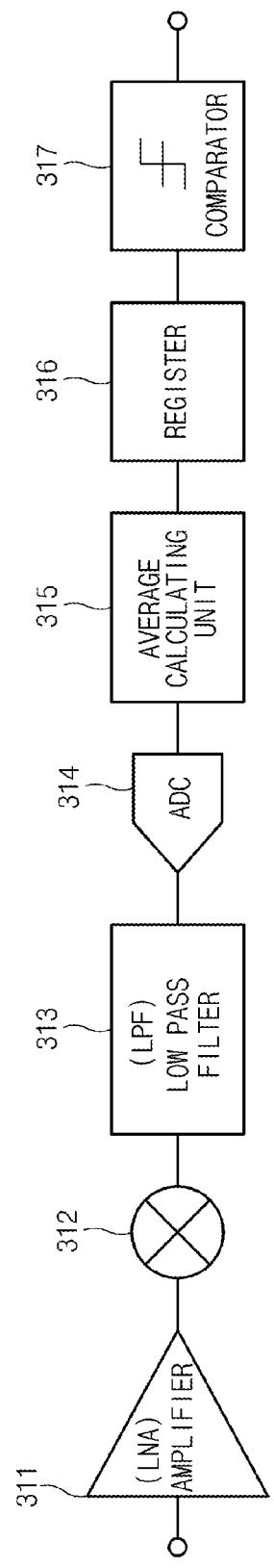
FIG. 2 is a detailed configuration diagram of a signal receiving unit of FIG. 1.

FIG. 2 is a detailed configuration diagram of a signal receiving unit 310 of FIG. 1.

As described above, the signal receiving unit 310 measures a size of a signal, converts a signal obtained by sequential beam forming into a digital signal for the purpose of comparison and then compares a size of the digital signal with a size of a previous signal, and sets a reactance of parasitic antennas 111, 112, 113, and 114 so as to generate a signal having the largest size at an initial state.

To this end, the signal receiving unit 310 includes an amplifier 311, a mixer 312, a low pass filter (LPF) 313, an analog to digital converter (ADC) 314, an average calculating unit 315, a register 316, and a comparator 317.

The amplifier 311 amplifies a signal received by the beam forming antenna 100. The mixer 312 converts a signal amplified by the amplifier 311 into a baseband signal.

The low pass filter (LPF) 313 performs low pass filtering on a signal which is converted to be a base band and the analog to digital converter (ADC) 314 converts the filtered analog signal into a digital signal.

The average calculating unit 315 calculates an average of digital signals every time to improve reliability of an entire antenna beam pattern.

The register 316 stores the digital signal received from the analog to digital converter 314 and the average received by the average calculating unit 315.

The comparator 317 compares strengths of signals in respective statuses through comparison operation. For example, when there are 16 parasitic antennas (16 directions of beams), sizes of the signals are compared for each of the 16 directions of beams to confirm a beam direction in which the size of the signal is the largest.

As described above, the size of the signal may be analyzed by simply using the signal receiving unit 310 instead of a complex digital operation and modeling.

Further, the signal which is received by the beam forming antenna is not processed by the transceiver, but analyzed and controlled by the signal receiving unit 310 which is connected in parallel thereto, so that it is possible to implement the antenna system without affecting the transceiving system of the related art.

Further, even though it is described that the function of the signal receiving unit has been described through configuration of blocks as illustrated in FIG. 2, the signal receiving unit may be replaced with other functional blocks which may measure and compare strengths of signals.

Hereinafter, the reactance load 200 will be specifically described with reference to FIGS. 5A, 5B, and 6.

Figure 5A:
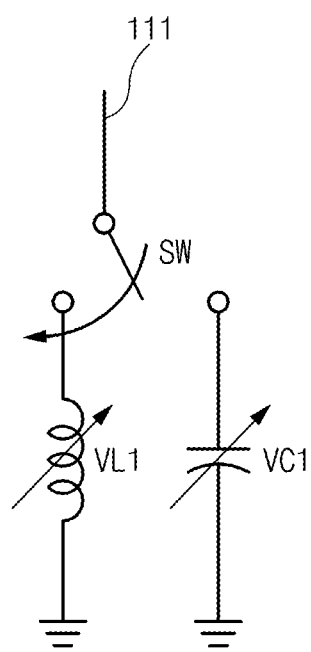
FIG. 5A is an exemplary view of a general reactance load.

Referring to FIG. 5A, the reactance load 200 includes a switch SW which is connected to the parasitic antenna 111, a variable inductor VL1, and a variable capacitor VC1. The variable inductor VL1 and the variable capacitor VC1 are connected in parallel to each other, so that the switch SW is connected to the variable inductor VL1 or the variable capacitor VC1. In this case, even though FIG. 5A illustrates the reactance load 200 which is connected to the parasitic antenna 111, the reactance load 200 is included in each of the parasitic antennas 111, 112, 113, and 114. Further, the reactance load may use a variable value by fixing the variable value.

In an initial operation mode, the parasitic antenna control unit 320 connects only the reactance load of only one parasitic antenna 111 to the variable inductor VL1 and reactance loads of the other parasitic antennas 112, 113, and 114 to the variable capacitor VC1. By doing this, the parasitic antenna 111 which is connected to the variable inductor VL1 shows a characteristic of a short circuit and the parasitic antennas 112, 113, 114, and 115 which are connected to the variable capacitor VC1 show a characteristic of an open circuit. Therefore, the beam is directed in a direction where the short circuit is formed.

The signal receiving unit 310 stores a received signal level in a state where only the parasitic antenna 111 shows a characteristic of the short circuit and the parasitic antenna control unit 320 forms beams with the different pattern to sequentially progress the beams.

Figure 3A:
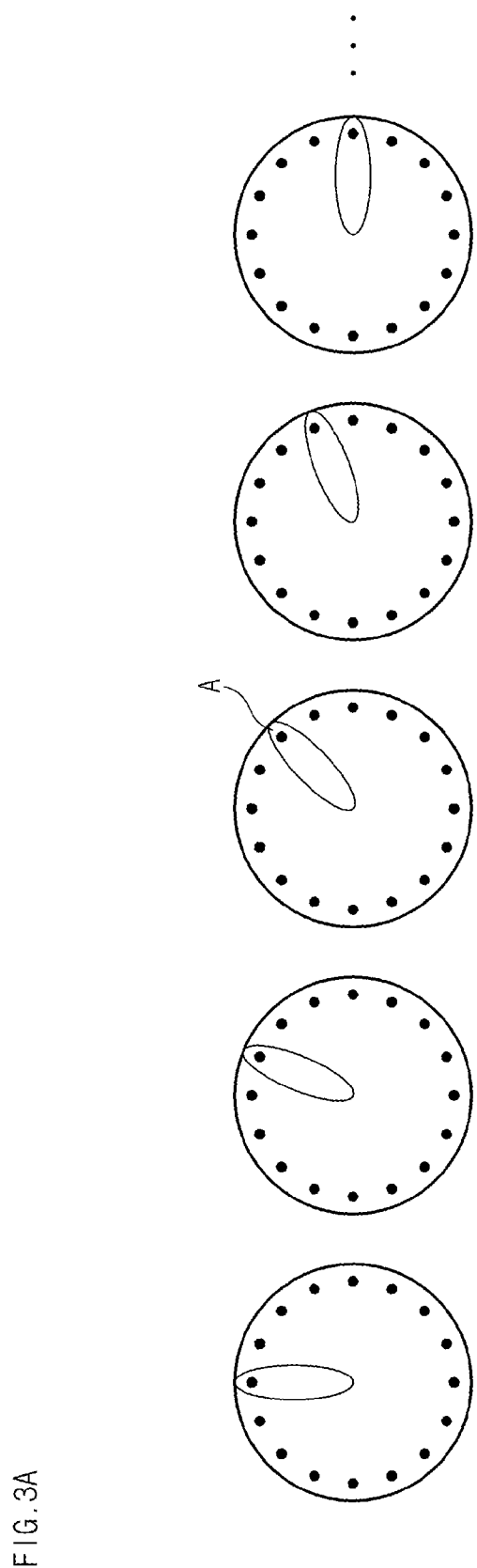
FIG. 3A is a view illustrating a sequential beam forming process by an initial operation of a smart antenna system according to an exemplary embodiment of the present invention.

FIG. 3A illustrates an example of sequential operations when there are 16 parasitic antennas and it is confirmed that the beams are sequentially formed by changing the reactance load of the parasitic antenna. In the above example, even though it is described that only one reactance load is shorted and the other loads are open for the convenience of description, an opposite situation may also be allowed.

Figure 5B:
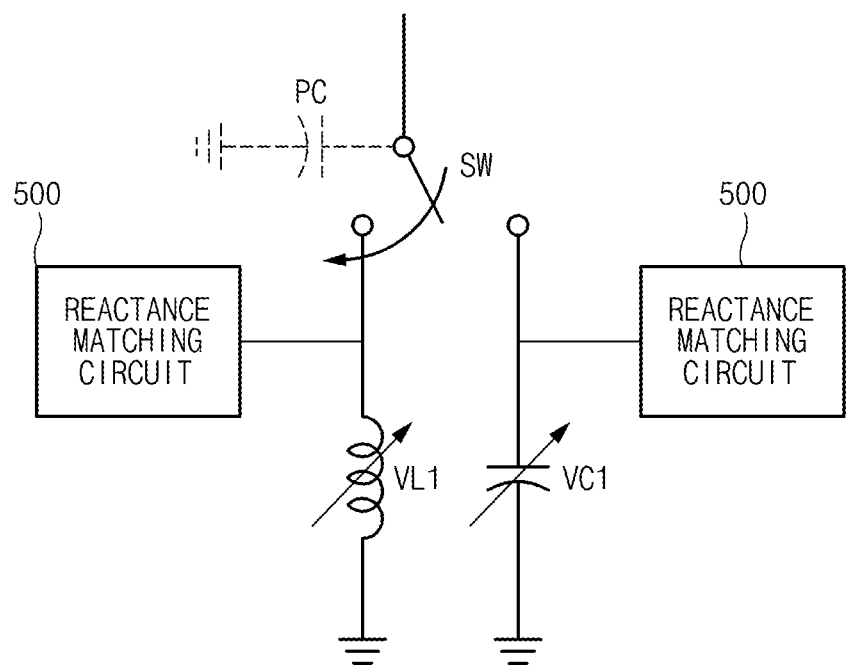
FIG. 5B is a view explaining an influence of a parasitic capacitor of a general reactance load.

Referring to FIG. 5B, when the reactance load is actually implemented by the RF switch, a value of the reactance load which is actually set is not satisfactorily implemented due to influence by the parasitic capacitor PC of the switch. Accordingly, a reactance matching circuit 500 is required and may be implemented through a circuit of FIG. 6.

Figure 6:
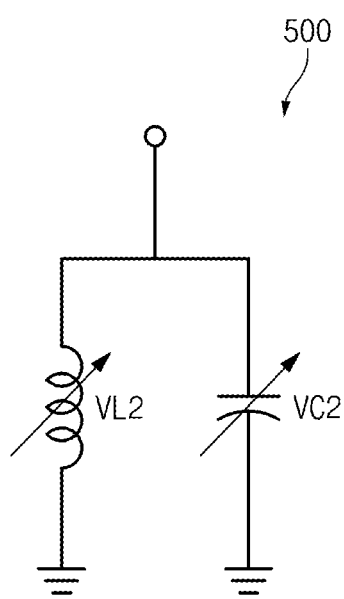
FIG. 6 is an exemplary view of a reactance matching circuit according to an exemplary embodiment of the present invention.

The reactance matching circuit 500 includes a variable inductor VL2 and a variable capacitor VC2 as illustrated in FIG. 6 and one end of the variable inductor VL2 and one end of the variable capacitor VC2 are commonly connected to a ground voltage terminal and the other ends are commonly connected to one contact point.

The reactance matching circuit 500 may exactly adjust the loads of the parasitic antennas to be a design value and further correct a center frequency when a center frequency is distorted. Further, by doing this, the reactance matching circuit 500 may further improve a frequency response characteristic.

After setting the reactance load, the reactance matching circuit 500 may perform impedance matching on a load of an active antenna in order to optimize a return loss of the antenna and the frequency characteristic.

As described above, according to the method of the related art which adjusts a reactance load of the antenna through the switch, it is difficult for the switch to exactly represent the reactance to be implemented, due to the parasitic component. In contrast, the present invention may exactly apply a value to be implemented by the reactance matching circuit 500.

Hereinafter, a parasitic antenna control method of a smart antenna system according to an exemplary embodiment of the present invention will be specifically described with reference to FIG. 7.

First, when the transceiver 400 is in a receiving mode (RX) in step S101, the antenna adjusting block 300 starts an operation. That is, as compared with the related art in which most of the beam forming antennas form and use the beam during an idle time of the receiving mode, the present invention employs a method in that the beam forming antennas operate during the entire receiving mode. This method is allowed because the antenna adjusting block 300 processes the signal in a parallel manner so as not to affect the transceiver 400. Therefore, according to the present invention, the beam of the antenna may be formed in a direction in which the reception sensitivity is maximized not only during the idle time of the receiving mode, but also for a signal source which varies in real time.

The signal receiving unit 310 determines whether the current status is an initial operation mode in step S102 and when the current status is the initial operation mode, sequentially forms beams like the general beam forming antenna, in order to verify a beam forming direction in which the highest reception is obtained in step S103. In this case, in order to sequentially form the beams, the parasitic antenna control unit 320 sequentially changes a value of the reactance load 200 of the parasitic antennas 111, 112, 113, and 114, so that the beam patterns of the antennas may be sequentially changed. In this case, the beam pattern may be sequentially changed as illustrated in FIG. 3A. In FIG. 3A, when there are 16 parasitic antennas, changes of 16 beam patterns are illustrated.

Thereafter, the signal receiving unit 310 calculates a strength of the signal for every beam pattern in step S104, compares the strengths of the signals for every beam pattern in step S105, and confirms the beam pattern having the highest strength of the signal (P1_max) to obtain a condition of a parasitic antenna for a beam pattern having the highest strength of the signal in step S106.

As described above, when the condition of the parasitic antenna in which the strength of the signal is the maximum (P1_max) is found, the sequence goes to the next step by being out of the initial operation mode.

Figure 7:
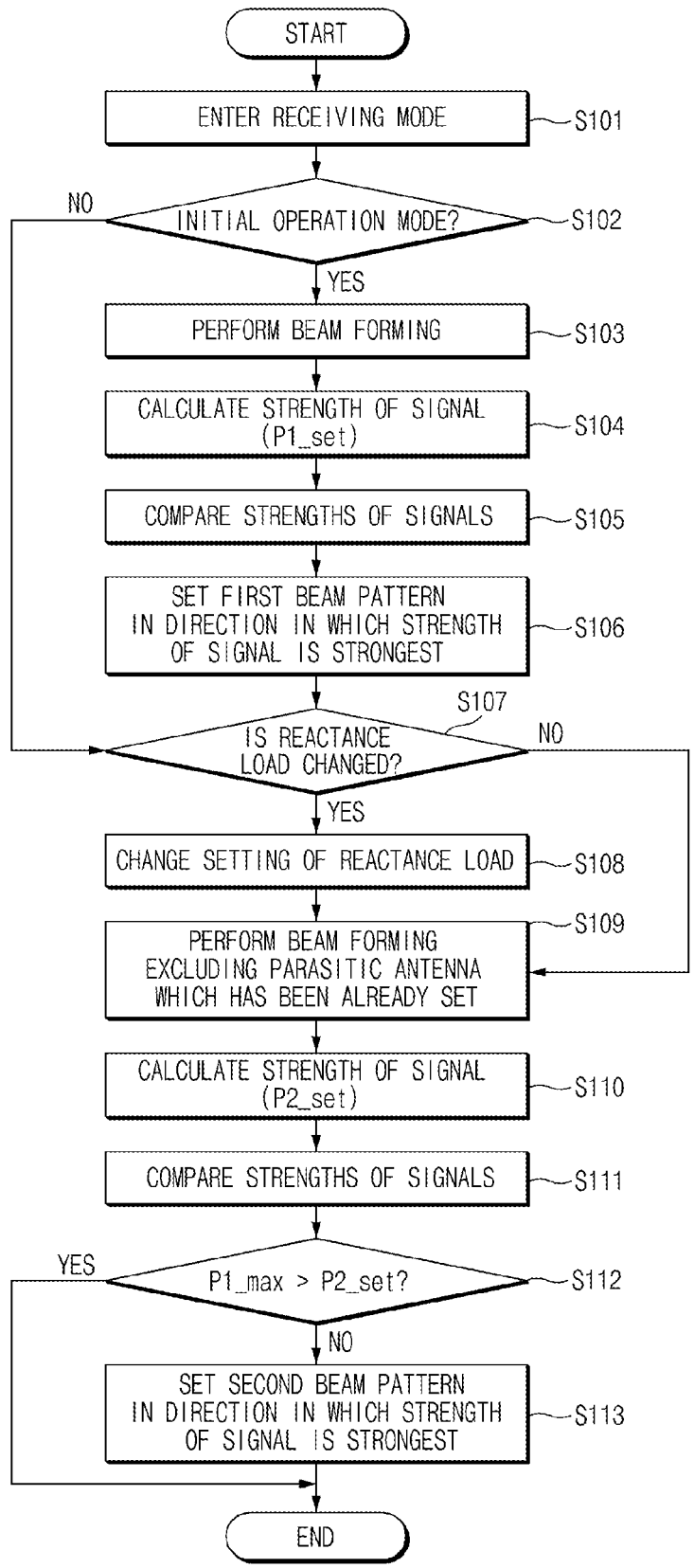
FIG. 7 is a flowchart illustrating a control method of a parasitic antenna of a smart antenna system according to an exemplary embodiment of the present invention.

In FIG. 7, even though it is described that the sizes of the signals are compared with each other after completing all of the sequential processes, in an actual operation, a first state and next state are directly compared and then the signal receiving unit is out of the initial operation mode.

When a value having the highest SNR is determined through one beam by the above steps S101 to S106, an operation for tracking another direction needs to be additionally performed in spite of detecting the optimal direction. Further, even though the above steps may be performed in the idle mode, when the beam pattern is changed in real time, an additional problem in that the sensitivity of the signal may be lowered while tracking another direction may be caused.

Therefore, the present invention suggests a technique which tracks a signal source through a plurality of beams and to this end, after fixing the optimal beam pattern which is tracked in the initial operation mode of the steps S101 to S106, another beam pattern is tracked to track the beam pattern having the optimal signal strength.

First, the signal receiving unit 310 determines whether to change the reactance load 200 in step S107. That is, since the size of the received signal is compared with the maximum beam size in the initial operation mode, in the next step, a value of the reactance load varies to adjust the beam size and additional search may be performed in step S108. For the convenience of description, a case in which the beam size is not changed will be described first. In FIG. 3B, a beam forming process of this step is illustrated.

A beam pattern of a signal having the highest strength among the beam patterns in the initial operation mode is considered as "A" in FIG. 3A. Referring to FIG. 3B, the beam pattern "A" is left as it is during the second beam tracking and only the reactance loads which are connected to another parasitic antenna are adjusted to sequentially form the additional beams in step S109.

That is, after fixing one beam pattern A having the largest signal size since the initial operation mode, additional optimal point is found through another beam. By using this method, the beam may be tracked in real time during the receiving mode and since the optimal beam A is fixed in the initial operation mode, deterioration in the receiving sensitivity in accordance with real time beam switching may be minimized. Further, receiving sensitivity of the signal source whose phase is changed by the channel may be improved through additional beam tracking.

Thereafter, the signal receiving unit 310 calculates strengths (P2_set) of signals for every beam pattern which is additionally formed except for the beam pattern A which is fixed in the initial operation mode in step S109 (in step S110) and compares the strengths of the signals to extract a beam pattern B having the strongest strength of the signal among the beam patterns which are additionally formed in step S111.

As described above, when two beams A and B are used and the phase changed receiving signal is received with the same phase, the size of the signal may be improved but when the phase changed receiving signal is received with an opposite phase, the size of the signal may be reduced.

Therefore, the signal receiving unit 310 compares a signal strength P1_max of a beam pattern A in the initial operation mode and a signal strength P2_set of the additional beam pattern B in step S112.

That is, the signal size calculated through two beams A and B is compared with the signal strength of the beam pattern A in the initial operation mode and when the signal size calculated through two beams A and B is higher than the signal strength of the beam pattern A in the initial operation mode, a second beam pattern B is fixed in step S113 and then the beam pattern forming is completed, otherwise, only the beam pattern A determined in the initial operation mode is used.

Figure 4A:
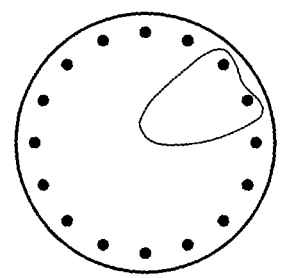
FIG. 4A is a view illustrating a beam pattern using two beams with the same size as illustrated in FIG. 3B.
Figure 4B:
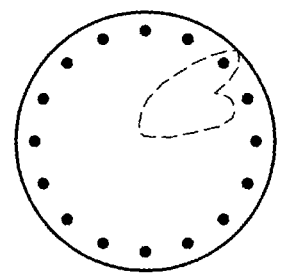
FIG. 4B is a view illustrating a beam pattern using two beams with the different sizes as illustrated in FIG. 3C.

The beam by two beam patterns A and B has a final beam pattern as illustrated in FIG. 4A. The beam by two beam patterns is formed to be wider than a single beam pattern in the initial operation mode. Further, referring to FIG. 4B, the size of the second beam C is smaller than the size of the first beam A in the initial operation mode and the shape of the pattern varies depending on the size.

Figure 3C:
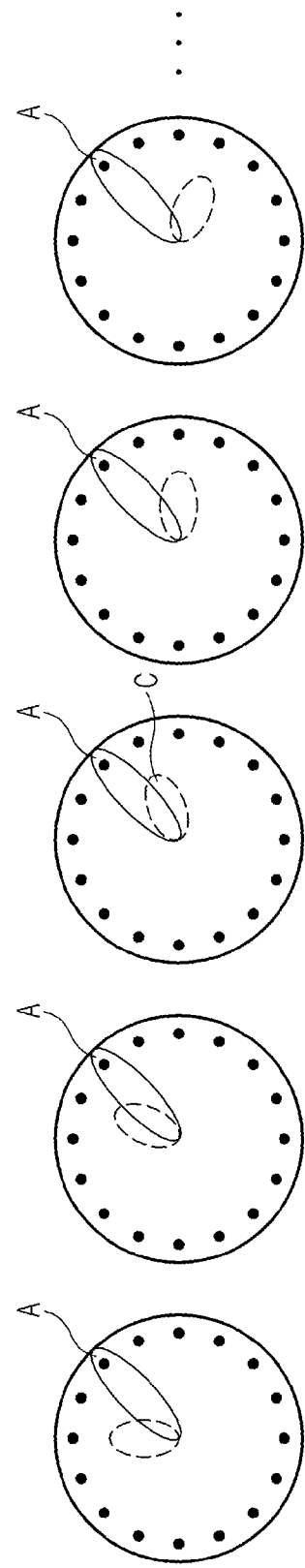
FIG. 3C is a view illustrating a process of sequentially forming a beam with different sizes by a smart antenna system according to an exemplary embodiment of the present invention.

In the meantime, referring to FIG. 3C, when the sizes of the beams are not equal to each other, it is assumed that the beam pattern A fixed in the initial operation mode is optimal and a size of signal changed by the channel is smaller than the size of the beam pattern A. That is, in order to track the beam through the second beam, the beam is tracked after changing a value of the reactance load. Since the signal sizes of the first beam pattern and the second beam pattern in the initial operation mode are different from each other, an antenna pattern as illustrated in FIG. 3C may be formed.

As described above, according to the present invention, a size of the beam in the initial operation mode is different from a size of the second beam to find an additional optimal point so that weights for strengths of the signal may vary. Subsequent processes may be continuously performed in a receiving mode. Further, in the above-described example, the signal source is tracked through two beams, but the signal source may be tracked through a plurality of beams in some exemplary embodiments.

In the meantime, in order to track a signal source which moves in real time, the initial status and the second status are performed and then the second pattern is fixed and the first pattern is tracked again (that is, the first beam and the second beam are used to be iterated, to track the beam in real time.

As described above, in the related art, the reactance load of the parasitic antenna is adjusted during a periodical time or an idle time, to steer the beam in a direction where the largest signal size is obtained. In contrast, according to the present invention, the beam may be tracked in real time regardless of the specific time or the idle time.

Further, in the related art, the signal source is tracked through one beam, but according to the present invention, the signal source is tracked through a plurality of beams and the optimal pattern which is tracked in the initial operation mode is fixed and then another beam pattern is additionally formed to find an additional optimal point.

While the exemplary embodiments of the present invention have been described for illustrative purposes, it should be understood that various modifications, changes, replacement, and addition are possible by those skilled in the art without departing from a technical spirit of the appended claims and all changes and modifications are therefore intended to be embraced by the range of the spirit of the present invention.

What is claimed is:

1. A smart antenna system including a beam forming antenna which includes an active antenna and parasitic antennas, the system comprising:
   a reactance load that is connected to one of the parasitic antennas;
   a transceiver configured to transmit and receive a signal to the beam forming antenna; and
   an antenna adjusting block configured to measure a strength of a signal of a beam pattern for every parasitic antenna, compare the strengths of the signals to fix the beam pattern of a signal having the strongest strength as a first beam pattern and sequentially perform the beam forming while fixing the first beam pattern to track a second beam pattern having the strongest strength of the signal.

2. The system of claim 1, wherein the antenna adjusting block forms a final beam pattern using the first beam pattern and the second beam pattern.

3. The system of claim 1, wherein the antenna adjusting block forms the first beam pattern and the second beam pattern to have the same size.

4. The system of claim 1, wherein the antenna adjusting block forms the first beam pattern and the second beam pattern to have different sizes.

5. The system of claim 1, wherein the antenna adjusting block further comprises:
   a signal receiving unit configured to measure and compare the signal strengths; and
   a parasitic antenna control unit configured to adjust the reactance load in accordance with the strength of the signal by being interworked with the signal receiving unit.

6. The system of claim 5, wherein the parasitic antenna control unit sets the reactance load such that the signal has the strongest strength.

7. The system of claim 5, wherein the signal receiving unit processes a signal in parallel with the transceiver.

8. The system of claim 5, wherein the signal receiving unit comprises:
   an amplifier configured to amplify a received signal;
   a mixer configured to convert the signal amplified by the amplifier into a base band signal;
   a low pass filter configured to perform low pass filtering on the signal which is converted into the base band signal by the mixer;
   an analog to digital converter configured to convert the filtered signal into a digital signal;
   a register configured to sequentially store the digital signal; and
   a comparator configured to compare sizes of the digital signals which are sequentially stored.

9. The system of claim 1, wherein the antenna adjusting block performs beam forming during a receiving mode of the transceiver and tracks the signal source in real time.

10. The system of claim 1, wherein the reactance load comprises:
    a switch that has one end connected to the parasitic antenna and is controlled by the antenna adjusting block so that the other end is connected to the variable inductor or the variable capacitor;
    a first reactance matching circuit that is connected to the variable capacitor, configured to set a load value of the parasitic antenna; and
    a second reactance matching circuit that is connected to the variable inductor, configured to set a load value of the parasitic antenna.

11. The system of claim 10, wherein the first and second reactance matching circuits comprise:
    a variable inductor whose one end is connected to the ground voltage terminal; and
    a variable capacitor whose one end is connected to the ground voltage terminal and the other end is connected to the variable inductor.

12. An improving method of a receiving performance of a smart antenna system, comprising:
    sequentially performing primary beam forming when entering a receiving mode;
    measuring strengths of signals for beam patterns formed by the primary beam forming and comparing the strengths of the signals of the beam patterns to determine and fix a first beam pattern having the strongest strength of the signal;
    performing secondary beam forming in a state when the first beam pattern is fixed;
    measuring strengths of signals for beam patterns formed by the secondary beam forming and comparing the strengths of the signals of the beam patterns to determine a second beam pattern having the strongest strength of the signal; and
    determining a final beam pattern using the first beam pattern and the second beam pattern.

13. The method of claim 12, further comprising:
    determining the first beam pattern as a final beam pattern when the strength of the signal by the final beam pattern obtained by combining the first beam pattern and the second beam pattern is weaker than the strength of the signal of the first beam pattern.

14. The method of claim 12, wherein in the determining of a second beam pattern, the second beam pattern having the same size as the first beam pattern is formed.

15. The method of claim 12, wherein in the determining of a second beam pattern, the second beam pattern having different size from the first beam pattern is formed.

* * * * *